Sept. 13, 1955   K. WHITMAN   2,717,619
CONTAINER
Filed Jan. 4, 1954

INVENTOR.
KENT WHITMAN
BY
ATTORNEYS

United States Patent Office 2,717,619
Patented Sept. 13, 1955

2,717,619
CONTAINER
Kent Whitman, Boston, Mass.

Application January 4, 1954, Serial No. 401,790

2 Claims. (Cl. 150—0.5)

When paint and various goods including certain foods are partly used or consumed and left for an appreciable time in the original container with a large air space, the remaining contents undergo deterioration which often renders it unfit for further use or consumption. Linseed oil plants are notorious in this respect since the air above the oil layer is sufficient to cause the formation of a heavy insoluble scum; and foods containing fat are likewise adversely affected when left in partly filled containers.

The principal object of the invention is to provide a container that is so formed that its body portion may be easily cut away to a level slightly above its unused contents and a cover that may be applied so as to fit tightly about its open end, thereby reducing the enclosed air to a minimum and overcoming the aforementioned difficulties.

Further objects relate to various features of construction and will be apparent from a consideration of the following description and the accompanying drawings, wherein.

In accordance with the present invention I provide a container comprising a tubular body with an integral bottom wall and an open upper end, the outer surface of the body being formed with circumferentially extending outwardly protruding bands parallel to each other and to the bottom wall and defining intervening circumferential recesses. The body is provided with a removable cover formed with a depending skirt, the inner wall of which is formed with at least one circumferentially extending recessed band and an adjacent circumferential rib complementary to one of the protruding bands and an adjacent recess so as to interlock therewith when the cover is applied with its skirt disposed about its open end.

Preferably both, but in any case at least the body is formed of a strong, tough, insert, resilient material capable of being cut with a knife, razor blade or other cutting implement. Although the vinyl resins as a group are generally satisfactory, the most outstanding material for my purpose is a relatively high molecular weight polyethylene thermoplastic such as sold under the name Polythene, since this material may readily be formed into containers by blow-molding and injection-molding procedures that are well known in the art. The container thus produced not only has the requisite strength to withstand shipping and rough handling, but also may be readily cut with an ordinary knife along the intervening circumferential grooves or recesses so as to reduce the size of the container to a minimum necessary for holding its unused contents.

Figure 1:
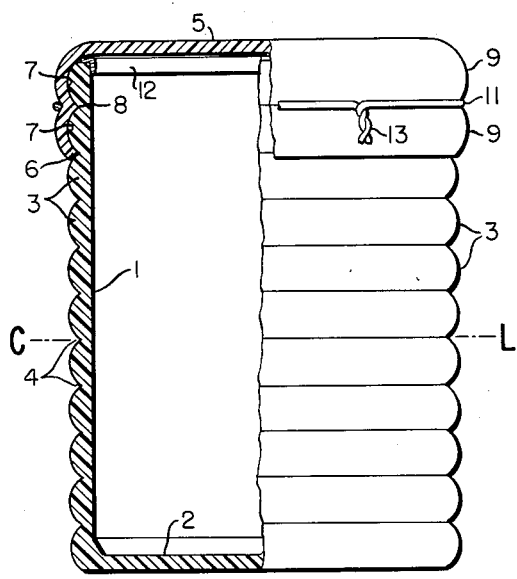
Fig. 1 is a view partly in elevation and partly in section of a container and cover constructed in accordance with the present invention.
Figure 2:
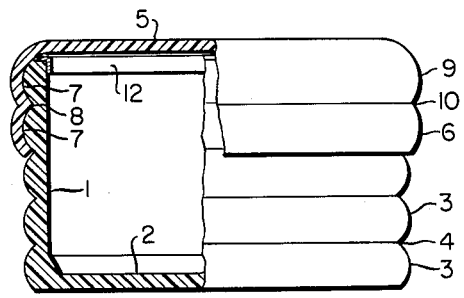
Fig. 2 is a view similar to Fig. 1, but showing the container after its upper part has been cut away.

Referring to Figs. 1 and 2 of the drawings, the numeral 1 designates the body of a cylindrical container having an integral bottom wall 2, the outer surface of the body being formed with protruding bands 3 of arcuate cross section which define intervening circumferential grooves or recesses 4.

The cap or cover 5 is formed with an integral depending skirt 6, the inner wall of which is formed with a pair of circumferentially extending recessed bands 7 and an intervening rib 8 complementary to the bands 3 and intervening recesses 4 when applied to the body as shown in Figs. 1 and 2.

The outside wall of the skirt 6 is also formed with a pair of circumferentially extending bands 9 and an intervening groove 10 which receives a sealing wire 11. If desired the upper edge of the container body may be provided with a reinforcing ring 12 preferably of angle cross section which cooperates with the sealing wire 11 in preventing removal of the cover without breaking the seal 13.

When the contents of the container are partly used the body portion above the unused contents may readily be cut along one of the circumferential grooves, here designated by the line C—L. The reinforcing ring 12 may, if desired, be replaced and the cover 5 applied with or without a sealing wire.

Figure 3:
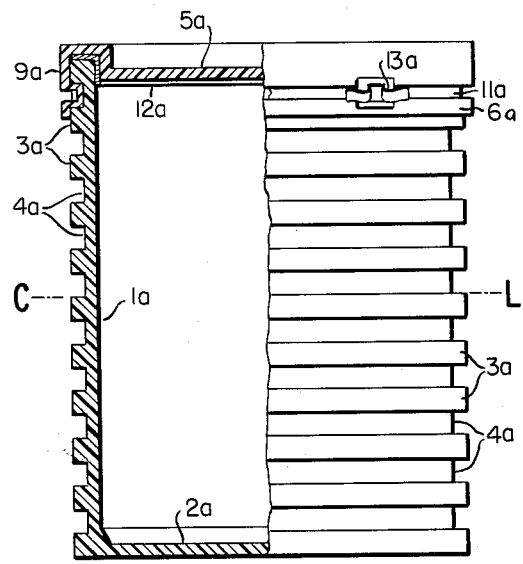
Figs. 3 and 4 are views, corresponding to Fig. 1, but showing further embodiments.
Figure 4:
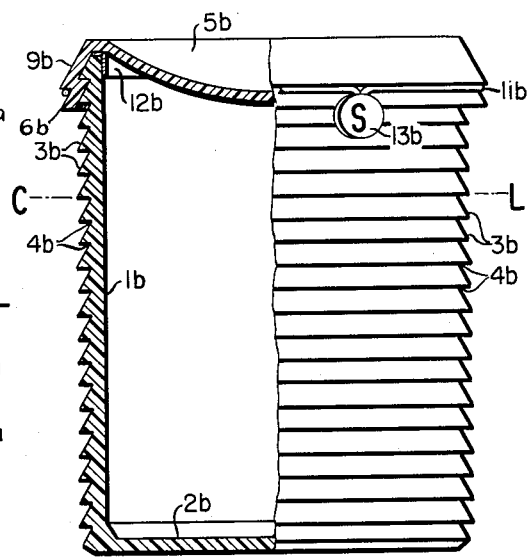

The embodiments shown in Figs. 3 and 4 are, in principle, the same as that shown in Fig. 1 and the same or similar reference characters are applied to corresponding parts. In the embodiment shown in Fig. 3 the outer surface of the body 1a is formed with protruding bands 3a and intervening recesses 4a of rectangular cross section, and the cover 5a is formed with a depending skirt 6a the inner surface of which is complementary to the outer surface of the body 1a.

In the embodiment shown in Fig. 4, the outer surface of the body 1b is formed with protuberances 3b and intervening recesses 4b of Z-shaped cross sections and the same is true with respect to the inner and outer surfaces of the skirt 6b of the cover 5b.

It will be noted that in each of the embodiments the recesses between the protruding bands define cutting lines which permit the removal of excess wall and when so cut away the cover may be interlocked with the top marginal portion of the remainder of the body to seal the container effectively and thus prevent deterioration of its remaining contents.

While I have shown and described different desirable embodiments of the invention it is to be understood that this disclosure is for the purpose of illustration and that various changes and modifications may be made without departing from the spirit and scope of the invention as set forth in the appended claims.

I claim:

1. A container of the type described comprising a one-piece tubular body member having an integral bottom wall, the outer surface of said body member being formed with circumferentially extending outwardly protruding bands parallel to each other and to said bottom wall and defining intervening circumferential recesses providing severance lines, and a cover member having a depending skirt, the inner wall of which is formed with at least one circumferential extending recessed bands and an adjacent rib complementary to each of the protruding bands and an adjacent recess of said body member so as to interlock therewith when said skirt is disposed about its open end, said body member being formed of a tough, resilient, inert material capable of being cut with a knife or the like instrument.

2. A container as set forth in claim 1, wherein the open end of the body members is provided with a removable and replaceable reinforcing ring.

References Cited in the file of this patent
UNITED STATES PATENTS

| 64,705 | Randol | May 14, 1867 |
| 703,351 | O'Donnell | June 24, 1902 |
| 1,035,634 | Platt | Aug. 13, 1912 |
| 1,173,755 | Straight | Feb. 29, 1916 |
| 1,933,838 | Ashe | Nov. 7, 1933 |
| 2,209,570 | Kraft | July 30, 1940 |
| 2,262,642 | Liberson | Nov. 11, 1941 |
| 2,487,400 | Tupper | Nov. 8, 1949 |
| 2,542,350 | Paulsen | Feb. 20, 1951 |
| 2,675,040 | Raun et al. | Apr. 13, 1954 |